US007052153B2

United States Patent
Kawashima et al.

(10) Patent No.: US 7,052,153 B2
(45) Date of Patent: May 30, 2006

(54) SPREAD ILLUMINATING APPARATUS OF SIDE-LIGHT TYPE

(75) Inventors: Satoshi Kawashima, Iwata-gun (JP); Akihisa Nishioka, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 570 days.

(21) Appl. No.: 10/206,333

(22) Filed: Jul. 29, 2002

(65) Prior Publication Data
US 2003/0026086 A1 Feb. 6, 2003

(30) Foreign Application Priority Data
Aug. 2, 2001 (JP) ....................................... 2001-234887

(51) Int. Cl.
*F21V 7/18* (2006.01)

(52) U.S. Cl. .......................... 362/31; 362/551; 362/561
(58) Field of Classification Search .................. 362/26, 362/31, 331, 330, 551, 581, 339, 561; 349/61, 349/62, 63, 65, 12, 58, 59, 60
See application file for complete search history.

(56) References Cited
U.S. PATENT DOCUMENTS 5,666,172 A * 9/1997 Ida et al. ...................... 349/58
5,694,190 A * 12/1997 Matsumoto et al. ........ 349/151
6,016,175 A * 1/2000 Kim ............................. 349/58
6,064,455 A * 5/2000 Kim ........................... 349/113
6,573,956 B1 * 6/2003 Shibata ........................ 349/65
2002/0044438 A1 * 4/2002 Ono et al. .................... 362/31

* cited by examiner

*Primary Examiner*—Sandra O'Shea
*Assistant Examiner*—Hargobind S. Sawhney
(74) *Attorney, Agent, or Firm*—Oliff & Berridge, PLC

(57) ABSTRACT

A housing frame includes a recess, a flat seat portion and a frame-shaped seat portion which are positioning units for a spot-like light source, a light conductive bar and a light conductive plate, respectively. The required assembly accuracy can be reliably obtained by fitting the light source, the light conductive bar and the light conductive plate to the predetermined positioning units of the housing frame. A recess and a flat seat portion have a thickness D2 smaller than the thickness D1 of a frame forming the positioning unit for the light conductive plate, and the housing frame forms a cavity, an opening of which is directed upward, and in order to obtain the required strength a reinforcing frame is provided. By reducing the thickness of the reinforcing frame, the light conductive plate can be disposed close to a display surface of any electronic product in incorporating the spread illuminating apparatus into any the electronic product.

8 Claims, 6 Drawing Sheets

SPREAD ILLUMINATING APPARATUS OF SIDE-LIGHT TYPE

BACKGROUND OF THE INVENTION

1. Field of the Invention

The present invention relates to a spread illuminating apparatus of side-light type used as an illuminating means for a liquid crystal display device.

2. Description of the Related Art

A liquid crystal display (hereinafter, referred to as "LCD") characterized by its low power consumption, low profile and light-weight has been extensively used as the display mainly for applications of personal computers and cellular phones, and the demand therefor has been increasing. Since a liquid crystal which is a structural element of the LCD does not emit light by itself unlike a light emitting type element such as a CRT, the LCD requires a separate illuminating means for observing an image. In particular, to satisfy great demand for thinning the apparatus and for the apparatus with a lower electric power consumption in recent years, a sheet-like spread illuminating apparatus of side-light type (light conductive plate type) is often used as an illuminating means for irradiating the LCD.

FIG. 5 shows basic components of a spread illuminating apparatus 1. The spread illuminating apparatus 1 mainly comprises a light conductive plate 2 and a bar-like lamp (lamp shaped like a bar) 11, and a bottom side 5 of the light conductive plate 2 is disposed on an observation surface of a reflection type liquid crystal display element (not shown). A light reflection pattern 7 is disposed on a top surface 6 of the light conductive plate 2. The light reflection pattern 7 comprises a plurality of grooves 8 substantially triangular in section and flat portions 9 adjacent to each of the plurality of grooves 8. In the light reflection pattern 7, the pitches of each of the grooves 8 are different at their positions so that brightness is substantially uniform at any position of the light conductive plate 2 irrespective of the distance from the lamp 11. This means that a ratio of a width (an occupied area) of each of the grooves 8 to a width (an occupied area) of each of the flat portions 9 is proportional to a distance from one side surface 3 of the light conductive plate 2. Since the grooves 8 of the light reflection pattern 7 formed on the light conductive plate 2 are minute, they cannot be visually recognized in observing a screen.

The lamp 11 comprises a light conductive bar 13 made of a bar-like transparent material, and a spot-like light source 12 disposed on either of both ends of the light conductive bar 13. A light emitting diode is used as the light source 12, the light conductive bar 13 made of the transparent material is disposed along the side surface 3 of the light conductive plate 2 at a predetermined distance, and the light source 12 is disposed close to one end 14, in FIG. 5, of the light conductive bar 13. An optical path conversion means 15 is formed on the light conductive bar 13. In an example shown in the figure, the optical path conversion means 15 comprises rough portions each substantially triangular in section and is disposed in the longitudinal direction of the light conductive bar 13 according to a predetermined rule.

A longitudinal periphery other than a surface facing the light conductive plate 2 of the light conductive bar 13 is covered by a light reflection member (a reflector) 16 in order to guide the light beam into the light conductive plate 2 at a high efficiency. The light reflection member 16 is formed, by bending a sheet-like film having been evaporated with a metal such as a silver, a sheet-like white film, a sheet-like film having been coated with a white paint, or a mirror-finished plate made of a metal such as an aluminum.

When such a spread illuminating apparatus 1 is incorporated into a reflection type liquid crystal display element (not shown), the light emitted from the bar-like light source 11 enters the light conductive plate 2 through the side surface 3 of the light conductive plate 2, and gradually emitted from the bottom surface 5 of the light conductive plate 2 while repeating reflection and refraction inside thereof and advancing toward a facing surface 10, so that the light illuminates the reflection type liquid crystal display element disposed adjacent to the light conductive plate 2. In addition, since the light reflection pattern 7 is formed on the light conductive plate 2, the amount of the light emitted from the bottom surface 5 can be distributed in a substantially uniform manner.

FIG. 6 shows an example of the conventional spread illuminating apparatus 1 shown in FIG. 5. A light emitting diode of a chip is used as the spot-like light source 12 for a size reduction, and mounted on a flexible printed circuit board (hereinafter, referred to as "FPC"). The light conductive bar 13 is covered by a reinforcing frame 21 made of a metal such as a stainless steel, and also the light source 12 is fixed, with an adhesive resin 22, to a support portion 21a provided on an end of the reinforcing frame.

FIG. 7 shows a cross-sectional view through the line A—A in FIG. 6. Components of the spread illuminating apparatus 1 are integrated and protected by a housing frame 23 when the spread illuminating apparatus is incorporated as the display device into any electronic product such as a cellular phone, thereby the efficiency of the handling in the assembly and the disassembly is improved. The housing frame 23 is a frame-like resin-molded member, and the light conductive bar 13 covered by the reinforcing frame 21 (and also by the light reflection member 16) and the light conductive plate 2 are housed by the housing frame 23. The reflection type liquid crystal display element (not shown) adjacent to the bottom surface 5 of the light conductive plate 2 can be observed from an opening 23a in the housing frame 23 through the light conductive plate 2.

However, the conventional spread illuminating apparatus 1 of the above configuration creates the following problems. First, as shown in FIG. 6, the light source 12 is fixed to a support portion 21a of the reinforcing frame with an adhesive resin 22, and it has been difficult to consistently implement the correct positioning with respect to the light conductive bar 13 because the light source is manually fixed thereto. Second, the fixing work is done by firstly fitting the light conductive bar 13 into the reinforcing frame 21, secondly fitting the light source 12 into a very small space, and finally, adhering the spot-like light source thereto. As a result, great skill is essentially required to obtain a desired assembly accuracy, and the workability is not so good. Further, if the FPC is also fixed at a position deviated from a predetermined position as a result of the light source 12 deviating from its correct position, a short-circuit can occur due to the contact with other metal components.

Third, since the reinforcing frame 21 is made of a sheet metal, and it is generally more difficult to control the accuracy of this reinforcing frame than the resin-molded one. Therefore, the improvement of the assembly accuracy has its limits because the light source 12 is fixed to the support portion 21a of the reinforcing frame which is apt to be dislocated. If the light source 12 is dislocated with respect to the light conductive bar 13, the brightness of the spread illuminating apparatus 1 is directly affected. Therefore, the consistency of the assembly accuracy is essential for improving the quality of the spread illuminating apparatus 1.

Finally, the housing frame 23 has to have a certain level of thickness enough to secure the necessary strength. As a result, in incorporating the housing frame 23 into any electronic product, the light conductive plate 2 and the reflection type liquid crystal display element (not shown) are positioned toward the recess by the thickness of the housing frame 23 from a front face of any electronic product (a front face of a display unit). Here, it is scientifically proved that the human's sense is keen enough to have a feeling of a remoteness even by the thickness of the housing frame 23, whereby a conventional structure in FIG. 7 cannot provide a satisfactory visibility as the display device.

Thus, the light conductive plate 2 and the reflection type liquid crystal display element (not shown) are adapted to be positioned as close to the front face of the concerned electronic product as possible, by making the light reflection member 16 in contact with the housing frame 23 and also by replacing a reinforcing frame U-shaped in section with a flat reinforcing plate 24 shown in FIG. 8. However, a problem occurs in that it is more difficult to secure the strength of the structure using the reinforcing plate 24 than that of a structure using the reinforcing frame 21 U-shaped in section.

SUMMARY OF THE INVENTION

The present invention has been made in light of the above problems, and it is an object of the present invention to obtain a more efficient workability and a more consistent accuracy for assembling the spread illuminating apparatus.

It is another object of the present invention to make the light conductive plate and the reflection type liquid crystal display element (not shown) in contact with the front face of the concerned electronic product so as to improve the visibility as the display device without sacrificing the strength.

In order to solve the above problems, a first aspect of the present invention is to provide a spread illuminating apparatus of side-light type comprising: a light conductive plate made of a light-transmissible material; a bar-like lamp comprising a light conductive bar made of a transparent material and disposed along and close to at least one end surface of the light conductive plate, and a spot-like light source disposed on at least one end of the light conductive bar; an FPC on which the light source is mounted; and a housing frame, the housing frame having respective positioning portions for the light source, the light conductive bar and the light conductive plate, thereby holding in place the light source, the light conductive bar and the light conductive plate, respectively.

In accordance with the present invention, by supporting the light source, the light conductive bar and the light conductive plate with the positioning units of the housing frame, the assembly accuracy for the above three components can be improved. Further, the light source, the light conductive bar and the light conductive plate can be easily positioned by forming the positioning units of the housing frame for the above three components, and as a result, the workability in the assembly can be improved.

In order to solve the above problems, according to a second aspect of the present invention, in the spread illuminating apparatus according to the first aspect of the present invention, the FPC extends on the housing frame from its bottom surface via its side and top surfaces to reach the positioning portion for the light source. In the present invention, the extension of the FPC can be simplified, and as a result, the workability in assembling the spread illuminating apparatus can be improved.

In order to solve the above problems, according to a third aspect of the present invention, in the spread illuminating apparatus according to the second aspect of the present invention, the side surface of the housing frame is provided with a guide for the FPC. In this configuration, the FPC can be reliably positioned by the guide for the FPC disposed on the side surface of the housing frame. As a result, the possibility that the FPC is fixed at a position deviated from a predetermined position and that a short circuit occurs due to contact with other metal components can be eliminated.

In order to solve the above problems, according to a fourth aspect of the present invention, in the spread illuminating apparatus according to any one of the first to third aspects of the present invention, a reinforcing frame is structured so as to enclose the positioning portions for the light source and the light conductive bar. In accordance with the present invention, the reinforcing frame protects the light source and the light conductive bar in the vertical direction and also secures the required strength. Further, the FPC can be pressed against the positioning unit for the light source with the reinforcing frame, by a combination with the FPC.

In order to solve the above problems, according to a fifth aspect of the present invention, in the spread illuminating apparatus according to the fourth aspect of the present invention, the reinforcing frame is shaped so as to keep clear of the FPC located at the bottom surface of the housing frame. In accordance with the present invention, an increase in thickness of the entire spread illuminating apparatus caused by an overlapping of the FPC and the reinforcing frame on the lower surface of the housing frame can be prevented.

In order to solve the above problems, according to a sixth aspect of the present invention, in the spread illuminating apparatus according to the fourth or fifth aspect of the present invention, the housing frame is made of a resin, and the reinforcing frame is made of a metal wherein the housing frame has a smaller thickness at the positioning portions for the light source and the light conductive bar than at the positioning portion for the light conductive plate so as to form a cavity, an opening of which is directed upward (hereinafter, referred to as "upward opening cavity").

In this configuration, since the thickness of the positioning units for the light source and the light conductive bar is set to be smaller than that of the positioning unit for the light conductive plate of the housing frame, and the housing frame has the upward opening cavity, the spread illuminating apparatus can be disposed closest to the front face of any electronic product in incorporating the spread illuminating apparatus into any electronic product. The degradation of the strength caused by setting the thickness of the positioning units for the light source and the light conductive bar of the housing frame to be smaller than that of the positioning unit for the light conductive plate of the housing frame can be compensated by the reinforcing frame made of the metal, and thus, the strength required for the spread illuminating apparatus can be secured.

DESCRIPTION OF THE PREFERRED EMBODIMENTS

Figure 1:
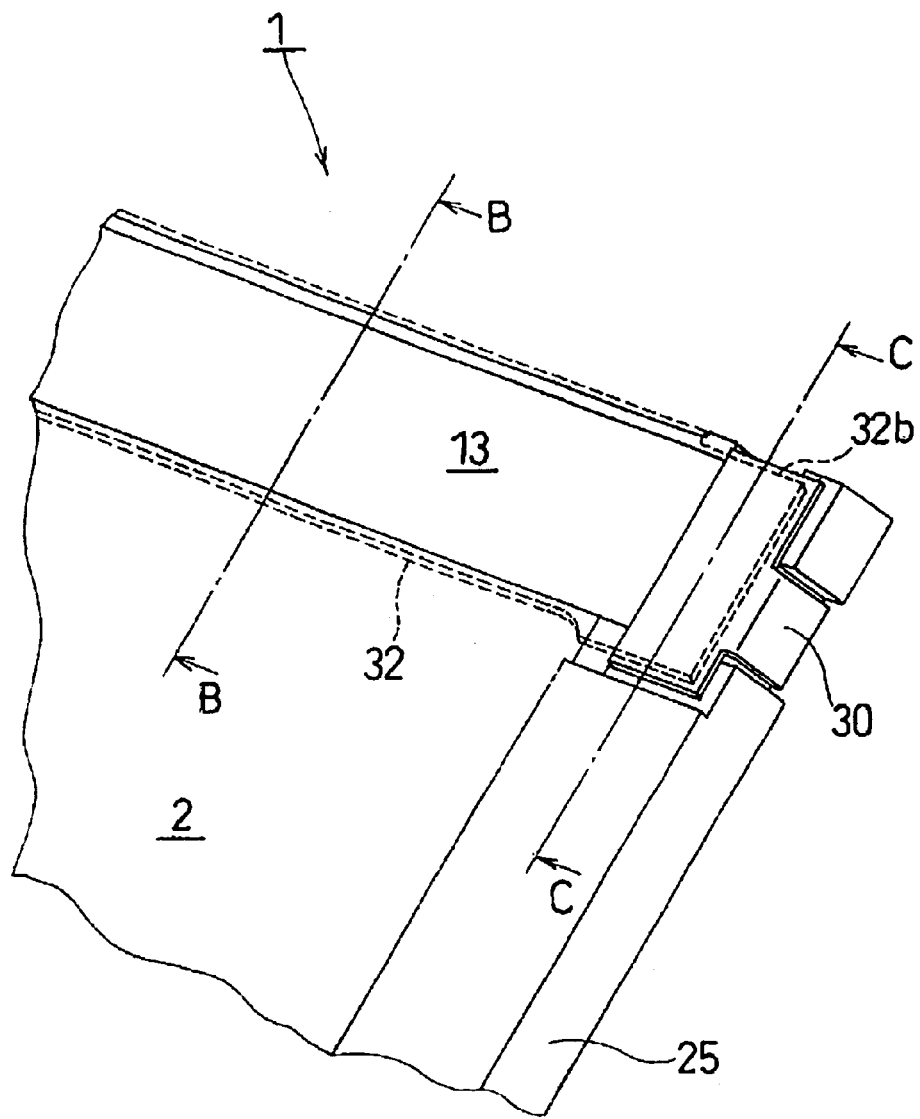
FIG. 1 is a perspective view showing a major portion of a spread illuminating apparatus according to an embodiment of the present invention.

Preferred embodiments of the spread illuminating apparatus according to the present invention will be hereinafter explained referring to the attached drawings. The components identical with or corresponding to those in the conventional spread illuminating apparatus are represented by the same reference numerals and the detailed description thereof is omitted.

In the description, the terms "top surface", "bottom surface", "side surface", "above", "below" and "at the side of" are used to express the positional relationship of each component in FIG. 3 for the convenience of the description. Thus, when the spread illuminating apparatus according to the embodiment of the present invention is incorporated into any electronic product such as personal computers and cellular phones, and is put into practical use, the "top surface" is not necessarily above the "bottom surface".

Figure 2:
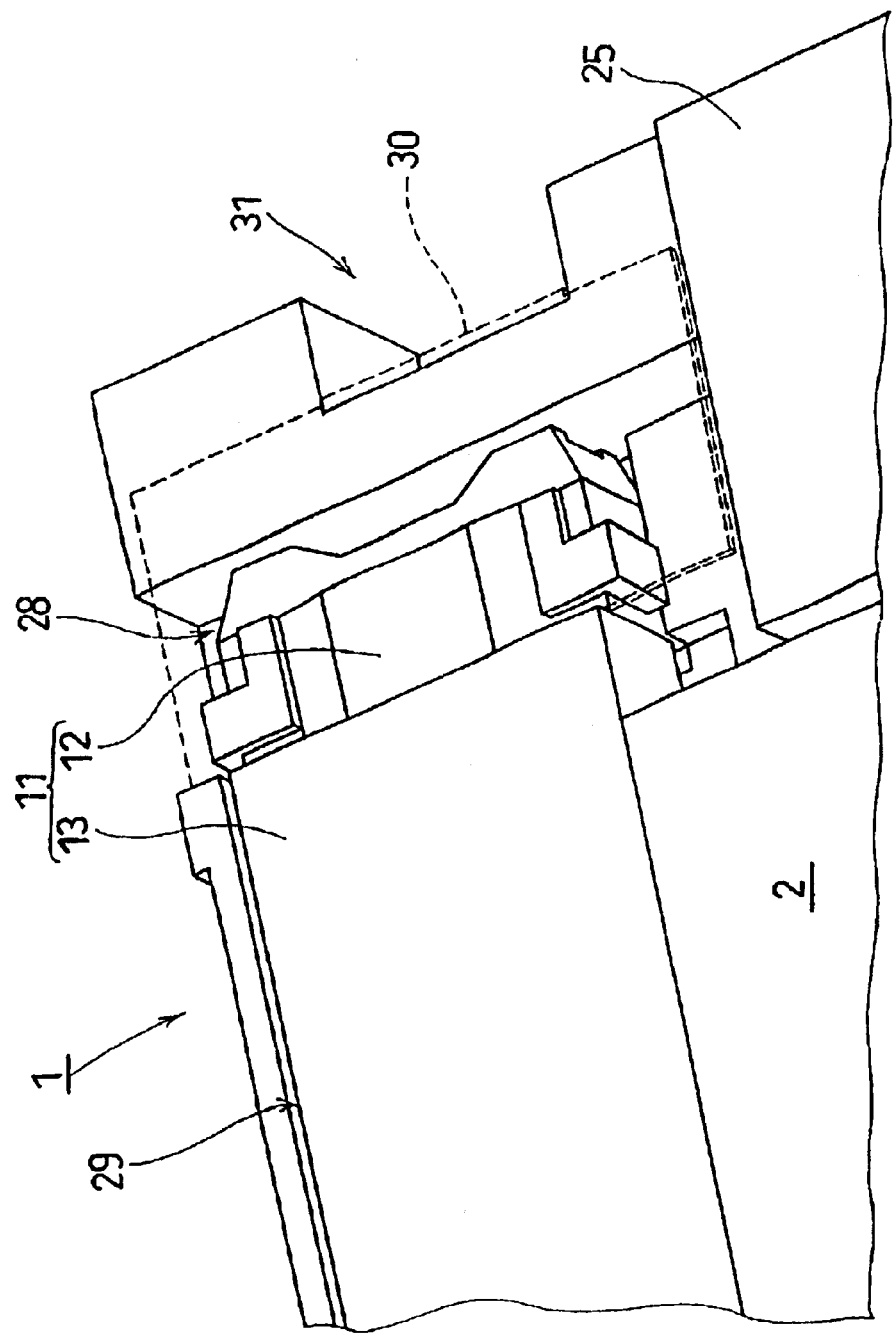
FIG. 2 is a perspective view showing the same major portion in FIG. 1 of the spread illuminating apparatus according to the embodiment of the present invention viewed from a different direction.
Figure 3A:
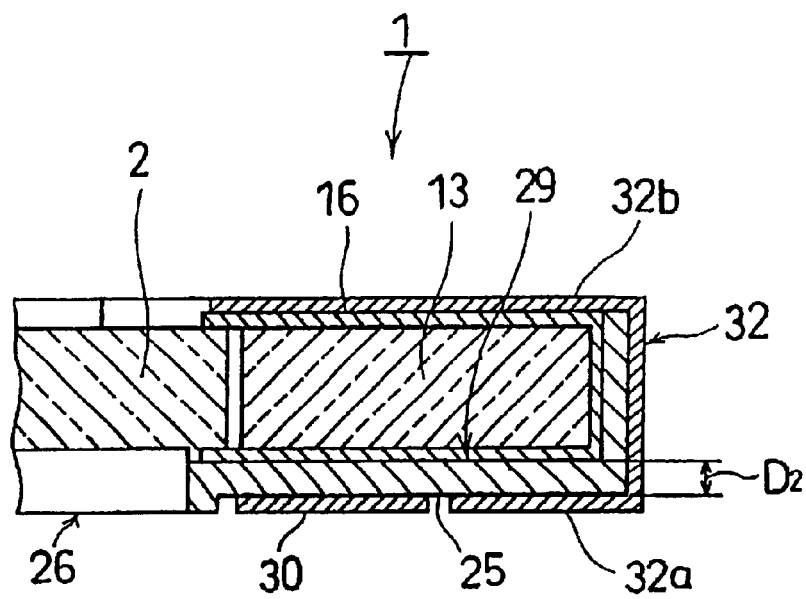
FIG. 3A is a cross-sectional view through the line B—B in FIG. 1.
Figure 3B:
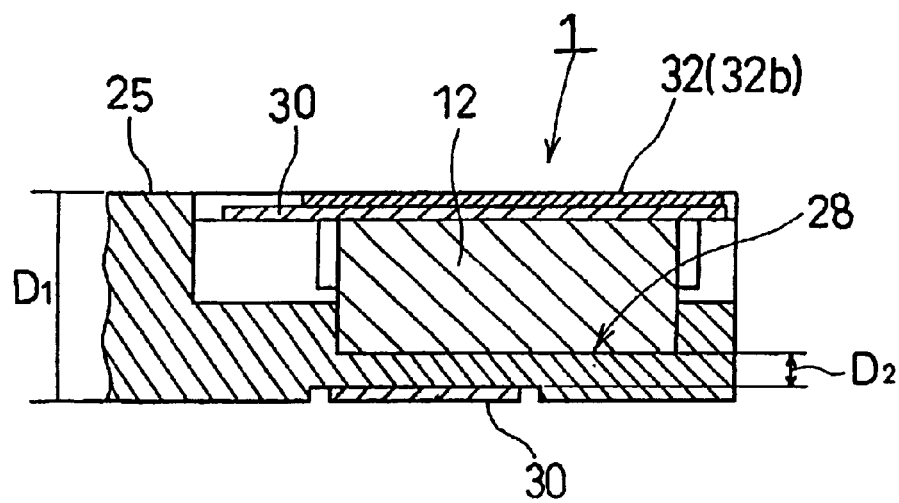
FIG. 3B is a cross-sectional view through the line C—C in FIG. 1.
Figure 4:
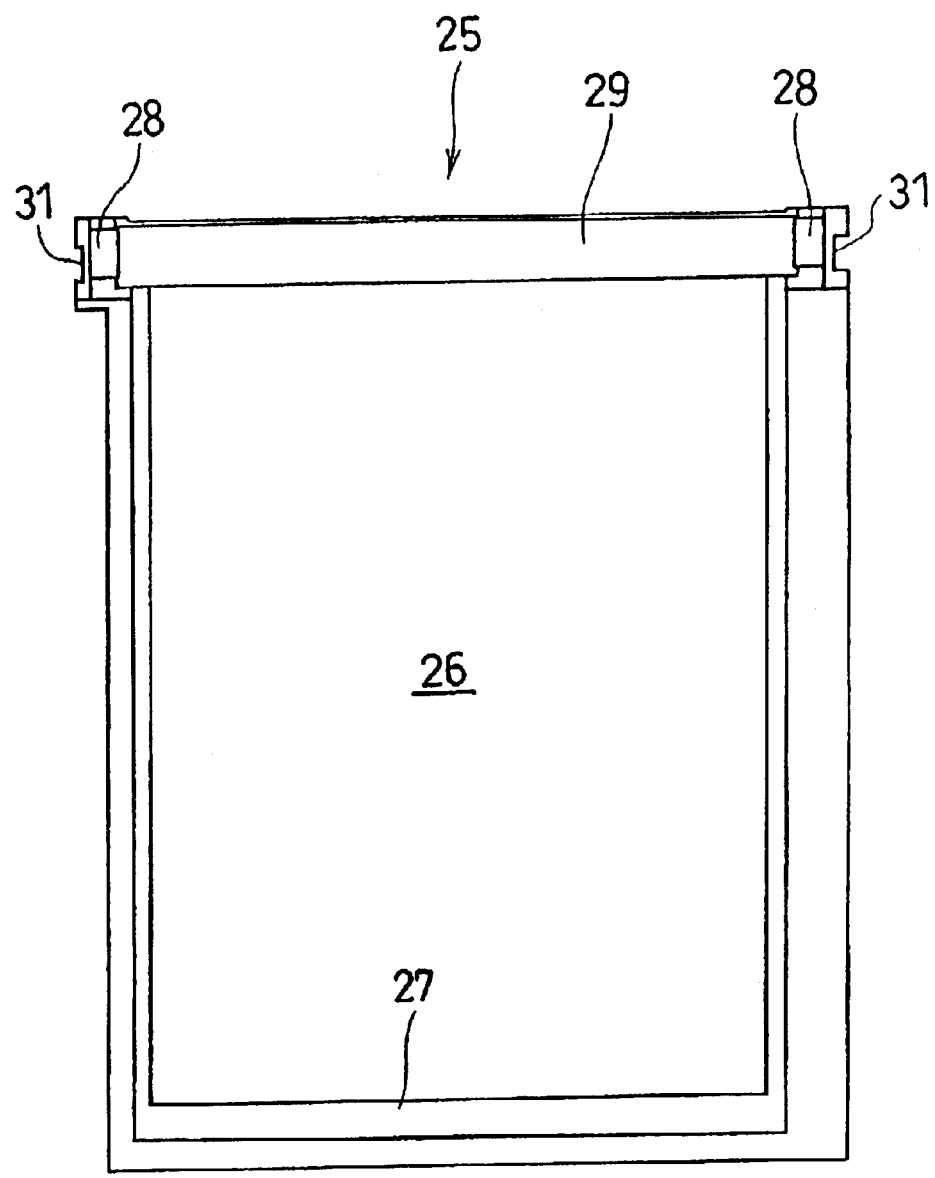
FIG. 4 is a plane view showing a housing frame for the spread illuminating apparatus according to the embodiment of the present invention.
Figure 5:
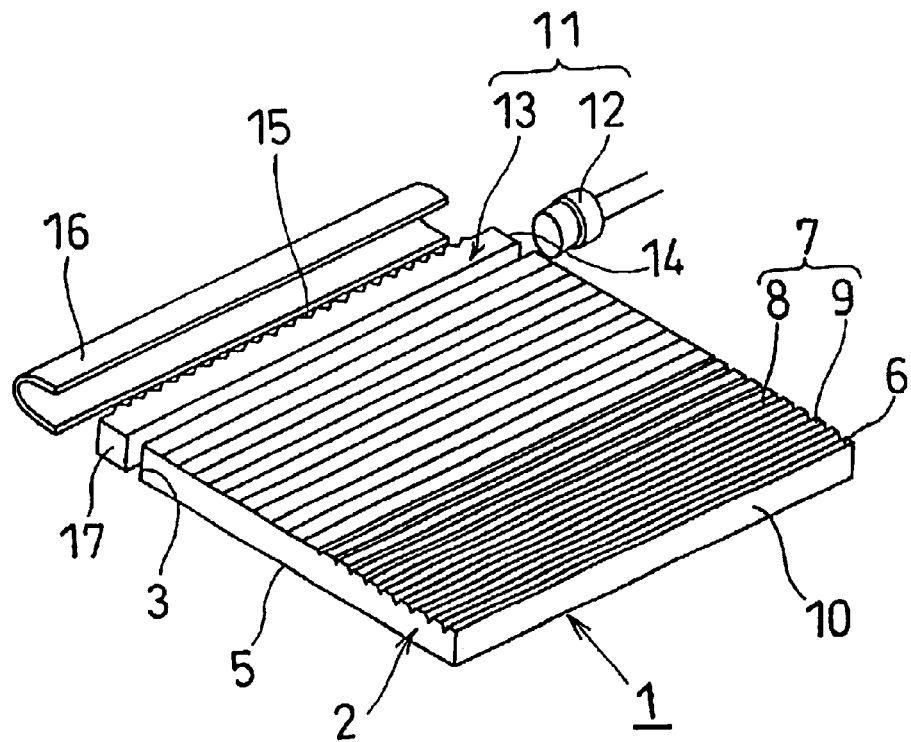
FIG. 5 is a perspective view showing a basic configuration of a conventional spread illuminating apparatus.
Figure 6:
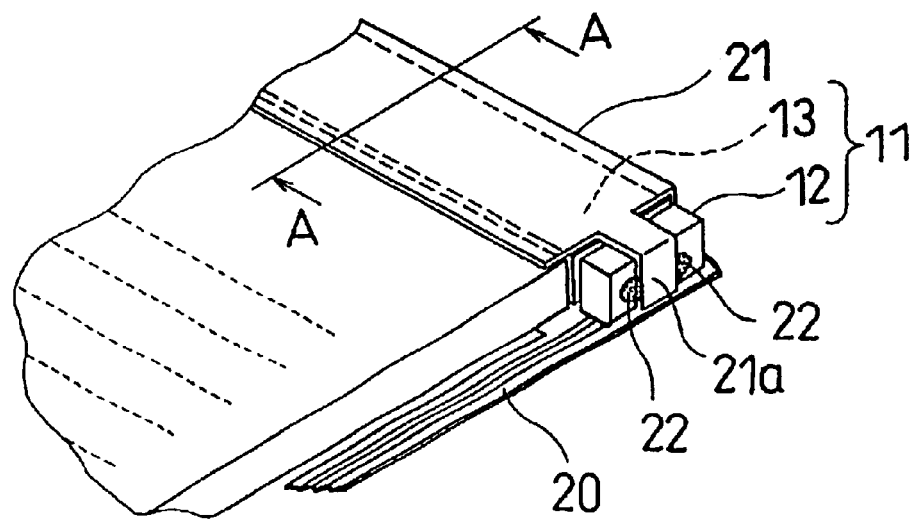
FIG. 6 is a perspective view of a major portion showing an example of the conventional spread illuminating apparatus.
Figure 7:
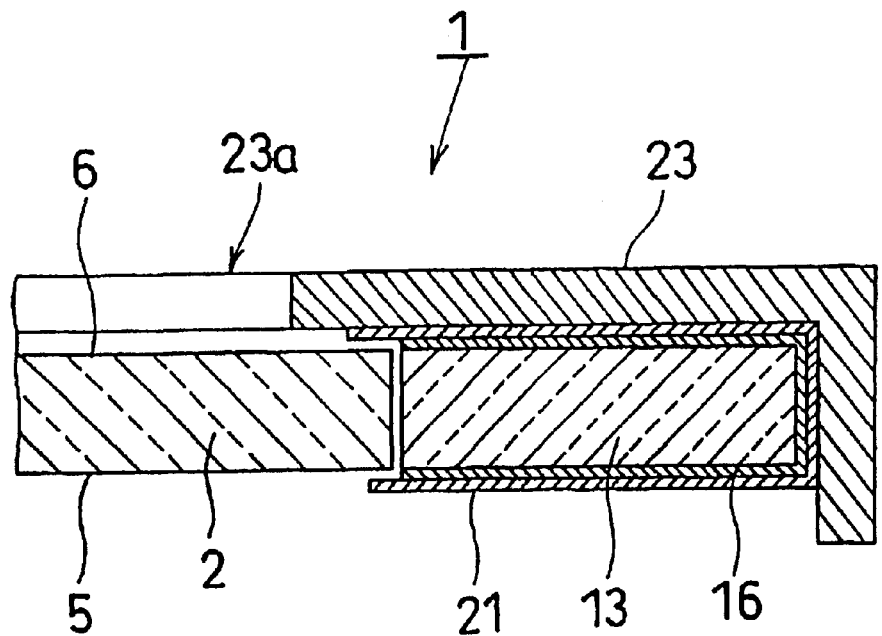
FIG. 7 is a cross-sectional view through the line A—A in FIG. 6.
Figure 8:
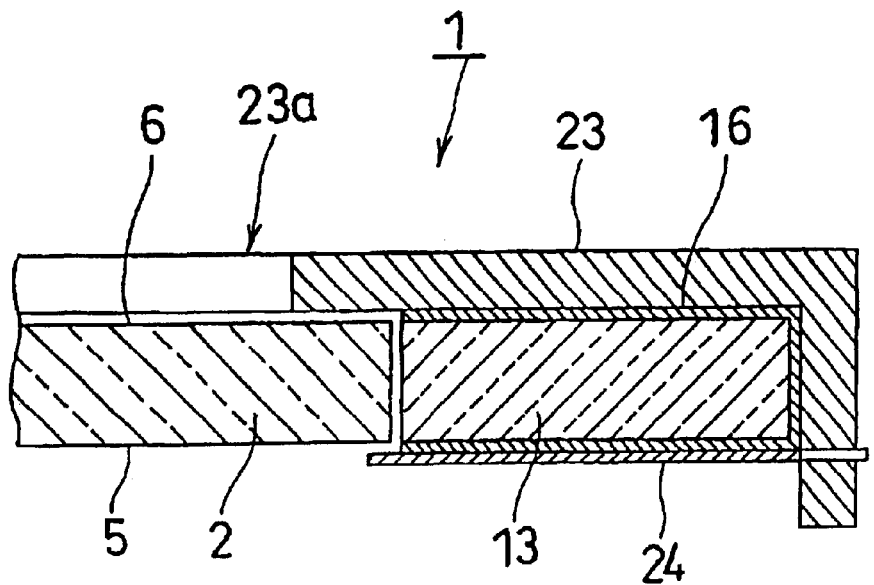
FIG. 8 is a cross-sectional view showing another conventional spread illuminating apparatus at a portion corresponding to the portion through the line A—A in FIG. 6.

Referring to FIGS. 1, 2, 3A and 3B, the spread illuminating apparatus 1 includes a housing frame 25 having positioning units for a spot-like light source 12, a light conductive bar 13 and a light conductive plate 2. Referring to FIG. 4, this housing frame 25 is a frame-shaped resin-molded member, and a frame-shaped seat portion 27 which is a positioning unit for the light conductive plate 2 is formed in an opening 26. A recess 28 which is a positioning unit for the light source 12 and a flat seat portion 29 which is a positioning unit for the light conductive bar 13 are formed on one side of the housing frame (an upper side in FIG. 4). In addition, grooves 31 which are guides for FPCs 30 and 30 are formed in the vicinity of the respective recesses 28 and 28 on each side surface of the housing frame 25. In the housing frame 25, as shown in FIGS. 3A and 3B, a thickness $D_2$ of the recess 28 which is the positioning unit for the light source 12 and of the flat seat portion 29 which is the positioning unit for the light conductive bar 13 is set to be smaller than a thickness $D_1$ of the frame constituting the positioning unit for the light conductive plate, and the housing frame has the upward opening cavity.

As FIG. 1 shows a perspective view of the FPC 30, and FIG. 3B shows a cross-sectional view thereof, the FPC extends from a bottom surface to a side surface of the housing frame 25 by being guided by each of the grooves 31, and further extends a top surface of the housing frame 25 and then, to each of the recesses 28 which is the positioning unit for the light source 12.

The spread illuminating apparatus 1 has a reinforcing frame 32 to cover the recess 28 which is the positioning unit for the light source 12 and the flat seat portion 29 which is the positioning unit of the light conductive bar 13 of the housing frame 25 both from the top surface and from the bottom surface. As the perspective view of the reinforcing frame 32 is indicated by a dotted line in FIG. 1, and the cross-sectional view thereof is indicated by a solid line in FIG. 3A, and the reinforcing frame 32 is a member U-shaped in section, and is made of a metal such as a stainless steel. One side 32a located therebelow is formed in such a way as to avoid contact with the FPC 30 located on the lower surface of the housing frame 25. The cross-sectional view of one side 32b which is an upper side of the reinforcing frame 32 is indicated in FIG. 3B by a solid line, and the one side has a shape so that the FPC 30 covering, from the top, the recess 28 which is the positioning unit for the light source 12 can be pressed against the recess 28, together with the light source 12.

The operational advantages obtained by the above embodiment of the present invention are described below. First, in accordance with the present invention, as shown in FIG. 2, the light source 12, the light conductive bar 13 and the light conductive plate 2 are supported in a predetermined positional relationship by the housing frame 25 having the recess 28 which is the positioning unit for the light source 12, the flat seat portion 29 which is the positioning unit for the light conductive bar 13 and the frame-shaped seat portion 27 which is the positioning unit of the light conductive plate 2. As a result, the required assembly accuracy can be reliably obtained only by mounting the light source 12, the light conductive bar 13 and the light conductive plate 2 on the predetermined positioning units of the housing frame 25. Further, the workability for correctly positioning each component can be improved.

Second, since the FPC 30 extends from the bottom surface to the side surface of the housing frame 25, and further extends to the recess 28 which is the positioning unit for the light source 12 from the top surface of the housing frame 25, the extension of the FPC can be simplified, and as a result, the workability in assembling the spread illuminating apparatus can be improved.

Third, since the grooves 31 and 31 which are the guides for the FPCs 30 and 30 are provided on both the side surfaces of the housing frame 25, the FPCs 30 and 30 can be reliably positioned only by passing each of the FPCs 30 from the side surface of the housing frame 25 through the grooves 31 and 31 in assembling the spread illuminating apparatus 1. As a result, the possibility that each of the FPCs is fixed at a position deviated from the predetermined position, and that a short circuit occurs due to contact with other metal components can be eliminated, whereby the highly reliable spread illuminating apparatus can be provided.

Fourth, the required strength can be secured, with the reinforcing frame 32, by protecting the light source 12 mounted in the recess 28 and the light conductive bar 13 mounted on the flat seat portion 29 from both the top and the bottom directions thereof. Further, the FPC 30 can be pressed against the recess 28, together with the light source, by one side 32b which is an upper side of the reinforcing frame 32, and the consistency and reliability of the assembly can be secured. In this embodiment, since the light reflection member 16 covering the light conductive bar 13 is in direct contact with the one side 32b which is upper side of the reinforcing frame 32, so that the one side 32b is disposed at the position closest to the front face of any electronic product when the spread illuminating apparatus 1 is incorporated into any electronic product.

Fifth, since another side 32a which is a lower side of the reinforcing frame 32 is formed in such a way as to avoid contact with the FPC 30 located on the lower surface of the housing frame 25, and the increase in the thickness of the entire spread illuminating apparatus caused by an overlapping of the FPC 30 and the reinforcing frame 32 on the lower surface of the housing frame 25 can be prevented.

Sixth, since in the housing frame 25 made of a resin, the thickness $D_2$ of the recess 28 which is the positioning unit for the light source 12 and the flat seat portion 29 which is the positioning unit for the light conductive bar 13 is set to be smaller than a thickness $D_1$ of the frame forming a frame-shaped seat portion 27 which is the positioning unit for the light conductive plate 2, and the housing frame has the upward opening cavity, the light reflection member 16 covering the light conductive bar 13 is in direct contact with the one side 32b which is the upper side of the reinforcing frame 32. And, in addition, as described above, the one side 32b which is the upper side of the reinforcing frame 32 is disposed at the position closest to the front face of any electronic product in incorporating the spread illuminating apparatus 1 into any electronic product. As a result, when the spread illuminating apparatus 1 according to the present embodiment is incorporated into any electronic product, the light conductive plate 2 and the reflection type liquid crystal display element (not shown) can be disposed at the position closer to the front face of any electronic product.

Finally, the strength required for the spread illuminating apparatus 1 can be secured by supplementing the degradation of the strength, with the reinforcing frame 32 made of a metal such as a stainless steel, caused by setting the thickness $D_2$ of the recess 28 which is the positioning unit for the light source 12 and the flat seat portion 29 which is the positioning unit for the light conductive bar 13 to be smaller than the thickness $D_1$ of the frame forming the frame-shaped seat portion 27 which is the positioning unit for the light conductive plate 2.

More Detailed Example

In a conventional spread illuminating apparatus, the housing frame 23 covering the top surface of the light conductive bar is disposed closest to the front face of any electronic product when the spread illuminating apparatus is incorporated into any electronic product. The necessary minimum thickness of the housing frame 23 is about 0.4 to 0.5 mm in order to obtain the required strength. On the other hand, in the spread illuminating apparatus according to the present embodiment, the one side 32b which is the upper side of the reinforcing frame 32 is disposed closest to the front face of any electronic product when the spread illuminating apparatus 1 is incorporated into any electronic product. The thickness of the reinforcing frame 32 is sufficiently 0.1 to 0.2 mm even taking into consideration of the required strength.

The human is apt to feel a remoteness even when the light conductive plate 2 and the reflection type liquid crystal display element are disposed on the distal side by about 0.3 mm. Thus, in the spread illuminating apparatus using the conventional housing frame 23, the human feels the sense of incompatibility that the light conductive plate 2 and the reflection type liquid crystal display element are disposed on the distal side by 0.4 to 0.5 mm which is the thickness of the housing frame 23 with respect to a display surface of any electronic product. As a result, a conventional device cannot provide a satisfactory visibility as the display device. In contrast, in the spread illuminating apparatus according to the present embodiment, the thickness of the reinforcing frame 32 is about 0.1 to 0.2 mm, and the user does not feel any remoteness described above, and the excellent visibility as the display device can be obtained.

The present invention has the following advantages. First, in the spread illuminating apparatus according to the first aspect of the present invention, the improvement of the workability in assembling the spread illuminating apparatus and the consistent assembly accuracy can be realized.

Second, in the spread illuminating apparatus according to the second aspect of the present invention, the improvement of the workability in assembling the spread illuminating apparatus and the consistent assembly accuracy can be realized by simplifying the extension of the FPC in assembling the spread illuminating apparatus.

Third, in the spread illuminating apparatus according to the third aspect of the present invention, the possibility that each of the FPCs is fixed at a position deviated from the predetermined position, and that a short circuit occurs due to contact with other metal components can be eliminated, whereby a more reliable spread illuminating apparatus can be provided.

Fourth, in the spread illuminating apparatus according to the fourth aspect of the present invention, the required strength can be secured, and the consistency and reliability in the assembly can be improved.

Fifth, in the spread illuminating apparatus according to the fifth aspect of the present invention, the increase in thickness of the entire spread illuminating apparatus is prevented, and further reduction in size can be promoted.

Finally, in the spread illuminating apparatus according to the sixth aspect of the present invention, the light conductive plate and the reflection type liquid crystal display element can be positioned close to the front face of any electronic product without sacrificing the strength, and the visibility as the display device can be improved.

What is claimed is:

1. A spread illuminating apparatus of side-light type, comprising:
    a light conductive plate made of a light-transmissible material;
    a bar-like lamp comprising a light conductive bar made of a transparent material and disposed along and close to at least one end surface of said light conductive plate, and a spot-like light source disposed on at least one end of said light conductive bar;
    a flexible printed circuit board on which said light source is mounted; and
    a housing frame, said housing frame having respective positioning portions for said light source, said light conductive bar and said light conductive plate, thereby holding in place said light source, said light conductive bar and said light conductive plate, respectively, wherein said flexible printed circuit board extends on said housing frame from a bottom surface via a side and a top surface of said housing frame to reach said positioning portion for said light source.

2. A spread illuminating apparatus according to claim 1, wherein said side surface of said housing frame is provided with a guide for said flexible printed circuit board.

3. A spread illuminating apparatus according to claim 2, further comprising a reinforcing frame which is structured so as to enclose said positioning portions for said light source and said light conductive bar.

4. A spread illuminating apparatus according to claim 1, further comprising a reinforcing frame which is structured so as to enclose said positioning portions for said light source and said light conductive bar.

5. A spread illuminating apparatus according to claim 4, wherein said reinforcing frame is shaped so as to keep clear of said flexible printed circuit board located at said bottom surface of said housing frame.

6. A spread illuminating apparatus according to claim 5, wherein said housing frame is made of a resin, and said reinforcing frame is made of a metal, and wherein said housing frame has a smaller thickness at said positioning portions for said light source and said light conductive bar than at said positioning portion for said light conductive plate so as to form a cavity.

7. A spread illuminating apparatus according to claim 4, wherein said housing frame is made of a resin, and said reinforcing frame is made of a metal, and wherein said housing frame has a smaller thickness at said positioning portions for said light source and said light conductive bar than at said positioning portion for said light conductive plate so as to form a cavity.

8. A spread illuminating apparatus according to claim 1, wherein said housing frame is made of a resin, and said reinforcing frame is made of a metal, and wherein said housing frame has a smaller thickness at said positioning portions for said light source and said light conductive bar than at said positioning portion for said light conductive plate so as to form a cavity.

* * * * *